(12) United States Patent
Wurtz et al.

(10) Patent No.: US 7,765,958 B2
(45) Date of Patent: Aug. 3, 2010

(54) ENTRANCE GATE FOR A LIVESTOCK SORTER

(76) Inventors: Henry J. Wurtz, 42668 600th Ave., Mountain Lake, MN (US) 56159; Dwayne P. Wipf, 42668 600th Ave., Mountain Lake, MN (US) 56159

(*) Notice: Subject to any disclaimer, the term of this patent is extended or adjusted under 35 U.S.C. 154(b) by 222 days.

(21) Appl. No.: 12/156,855

(22) Filed: Jun. 5, 2008

(65) Prior Publication Data
US 2009/0301405 A1 Dec. 10, 2009

(51) Int. Cl.
*A01K 29/00* (2006.01)

(52) U.S. Cl. ............ 119/842; 292/259 R; 119/734

(58) Field of Classification Search ........... 119/482, 119/501, 510, 514, 516, 524, 734, 738, 739, 119/741, 743, 745, 840, 841, 842, 843; 209/592; 292/194, 200, 259 R
See application file for complete search history.

(56) References Cited

U.S. PATENT DOCUMENTS

| | | | | |
|---|---|---|---|---|
| 584,536 | A * | 6/1897 | Auchley | 119/722 |
| 1,381,797 | A * | 6/1921 | Caspers | 119/840 |
| 3,563,593 | A * | 2/1971 | Leier et al. | 292/296 |
| 4,280,448 | A | 7/1981 | Ostermann | |
| 4,813,379 | A * | 3/1989 | Harmsen | 119/840 |
| 5,579,719 | A | 12/1996 | Hoff et al. | |
| 5,706,763 | A * | 1/1998 | Trethewey | 119/737 |
| 5,979,365 | A * | 11/1999 | Sorraghan et al. | 119/524 |
| 5,984,387 | A * | 11/1999 | Zeller | 292/296 |
| 6,239,711 | B1 | 5/2001 | Downey et al. | |
| 6,526,919 | B1 | 3/2003 | Schick | |
| 6,837,189 | B2 | 1/2005 | Schick | |
| 6,837,190 | B2 * | 1/2005 | Thibault et al. | 119/840 |
| 7,210,428 | B2 | 5/2007 | Thibault | |
| 2003/0192487 | A1 | 10/2003 | Zimmerman | |
| 2005/0161006 | A1 * | 7/2005 | Reimer et al. | 119/842 |
| 2005/0161007 | A1 * | 7/2005 | Huisma et al. | 119/842 |
| 2007/0056529 | A1 * | 3/2007 | Baarsch et al. | 119/842 |

OTHER PUBLICATIONS

SortAll marketing brochure of Schick Enterprises, 3320 Scherer Rd, Kutztown, PA 19530, www.schickenterprises.com.
Phason Electronic Control Systems, Pro Sort Wireless Technology marketing brochure of Gro Master, Inc., 3838 N. 108th St., Omaha, NE 68164, www.phason.ca.
Super Sorter marketing brochure of Gro Master, 3838 N. 108 St., Omaha, NE 68164, www.supersorter.com.

* cited by examiner

*Primary Examiner*—Rob Swiatek
*Assistant Examiner*—Ebony Evans
(74) *Attorney, Agent, or Firm*—Dennis L. Thomte; Thomte Patent Law Office, LLC

(57) ABSTRACT

An entrance gate for a livestock sorter which includes a pair of entrance gate members which are movable between open and closed positions. The amount of opening movement of the gate members is selectively adjustable without the need of a wrench or the like.

9 Claims, 5 Drawing Sheets

ENTRANCE GATE FOR A LIVESTOCK SORTER

BACKGROUND OF THE INVENTION

1. Field of the Invention

This invention relates to an entrance gate for a livestock sorter and more particularly to an entrance gate for a livestock sorter wherein the distance between the gate members of the entrance gate, when in the open position, may be quickly and easily adjusted without the need of a wrench, pliers or other tool.

2. Description of the Related Art

Many types of livestock sorters have been previously provided which are used to weigh livestock such as pigs to separate or sort the same depending upon the weights thereof. Normally, the conventional sorters include a cage having an entrance end and an exit end with a weighing scale being provided within the bottom of the cage. The exit end of the cage has an exit gate associated therewith which directs the pigs to various pens depending upon the weights thereof. Normally, the entrance end of the cage is provided with an entrance gate which is closed to maintain an animal within the cage and which may be opened to permit the animal to enter the cage. Since the size of the pigs being weighed will vary, a problem has been encountered in that if the entrance gate is completely open, more than one pig may enter the interior of the cage which will dramatically affect the weighing operation. In an effort to prevent more than one pig from entering the cage at one time, an adjustment means was previously provided to limit the amount of opening movement of the opposing gate members at the entrance end of the sorter. However, that adjustment could only be accomplished through the use of a wrench, pliers or other tool. The requirement of the necessity of a wrench, pliers or tool being used is sometimes inconvenient since such tools are not normally readily available and the adjustment of the adjustment bolt thereof being time consuming.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An entrance gate is provided for a livestock sorter which includes a weighing scale within a cage with the cage having an upper end, a first side, a second side, an exit end which is selectively closable by an exit gate and an open entrance end. An elongated actuator member, having first and second ends, is horizontally slidably mounted on the cage at the upper end thereof which is selectively movable between a retracted position to an extended position. The first end of the actuator member is positioned at the entrance end of the cage and has a horizontally disposed support plate secured thereto for movement therewith. A first vertically disposed shaft is rotatably mounted on the cage at the entrance end thereof at the first side thereof and a second vertically disposed shaft is rotatably mounted on the cage at the entrance end thereof at the second side thereof. A first vertically disposed gate member having upper and lower ends is spaced from the first shaft and a second vertically disposed gate member having upper and lower ends is spaced from the second shaft. A first support means is secured to and extends between the first shaft and the first gate member and a second support means is secured to and extends between the second shaft and the gate member. A first linkage means is secured to and extends between the first shaft and one end of the support plate. A second linkage means is secured to and extends between the second shaft and the other end of the support plate.

The movement of the actuator member from its extended position to its retracted position causes the first and second gate members to move to a closed position wherein they prevent an animal from entering the cage through the entrance end thereof and prevent an animal within the cage from moving rearwardly through the cage through the entrance end thereof. The movement of the actuator member from its retracted position to its extended position causes the first and second gate members to move from their closed position towards their open position wherein they permit an animal to enter the cage through the entrance end. A first stop or bumper is secured to the actuator adjacent the second end thereof. An adjustable stop means is mounted on the cage which is adapted to be engaged by the first stop as the actuator member moves between its retracted position to its extended position to limit the amount of opening movement of the first and second gate members as they move from their closed positions to their open positions to adjustably vary the horizontal distance between the first and second gate members when they are in their open positions. The adjustable stop means is adjustable without the need of a wrench or the like.

It is therefore a principal object of the invention to provide an improved entrance gate for a livestock sorter.

A further object of the invention is to provide an adjustable entrance gate for a livestock sorter wherein the width of the entrance opening may be selectively varied without the need of a wrench, pliers or tool.

Still another object of the invention is to provide an entrance gate for a livestock sorter including a unique adjustable means which limits the width of the entrance opening at the entrance end of the sorter.

Still another object of the invention is to provide an adjustment means of the type described which is quickly and easily adjusted.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
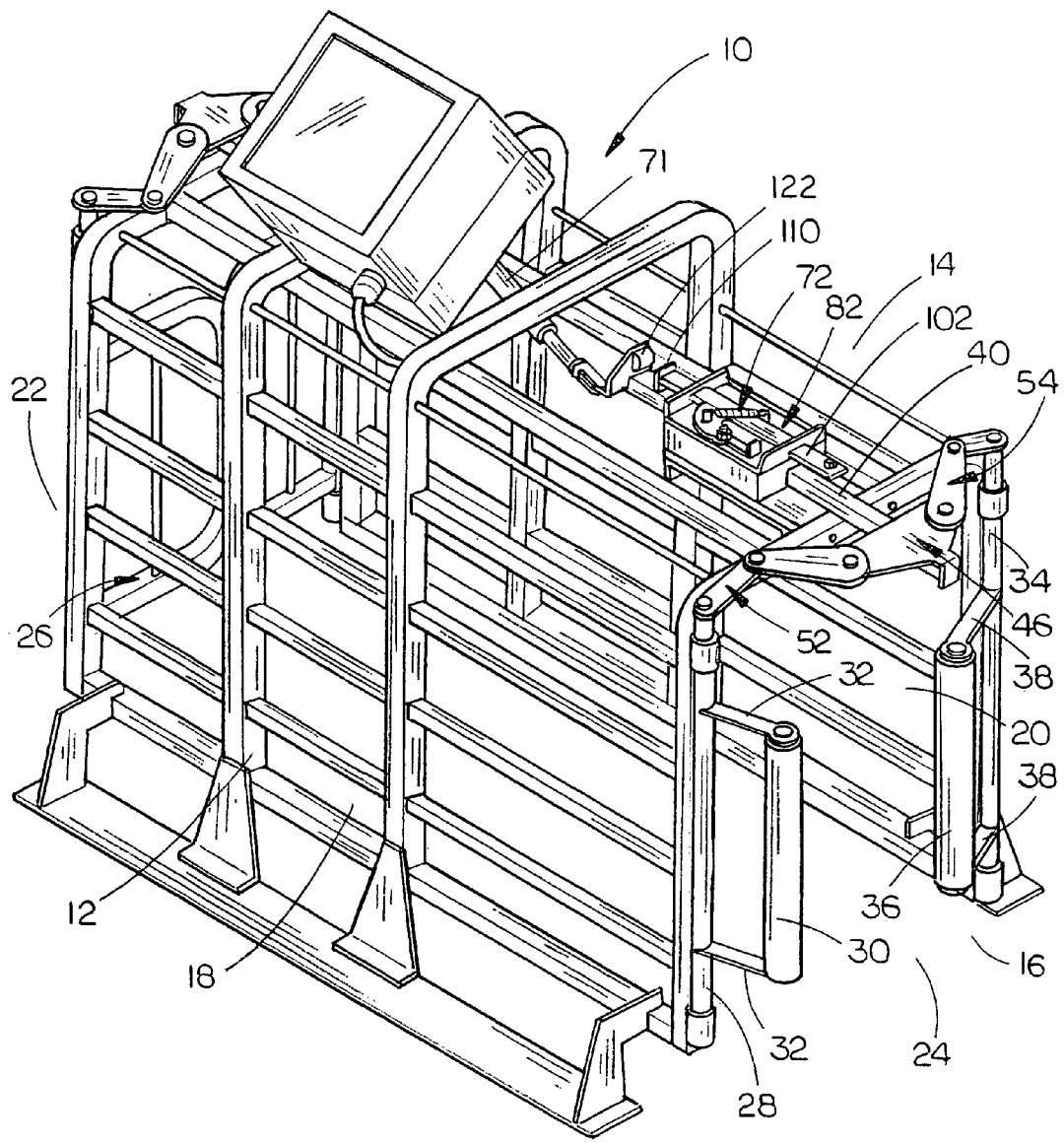
FIG. 1 is a front perspective view of a livestock sorter having the entrance gate of this invention mounted thereon.
Figure 2:
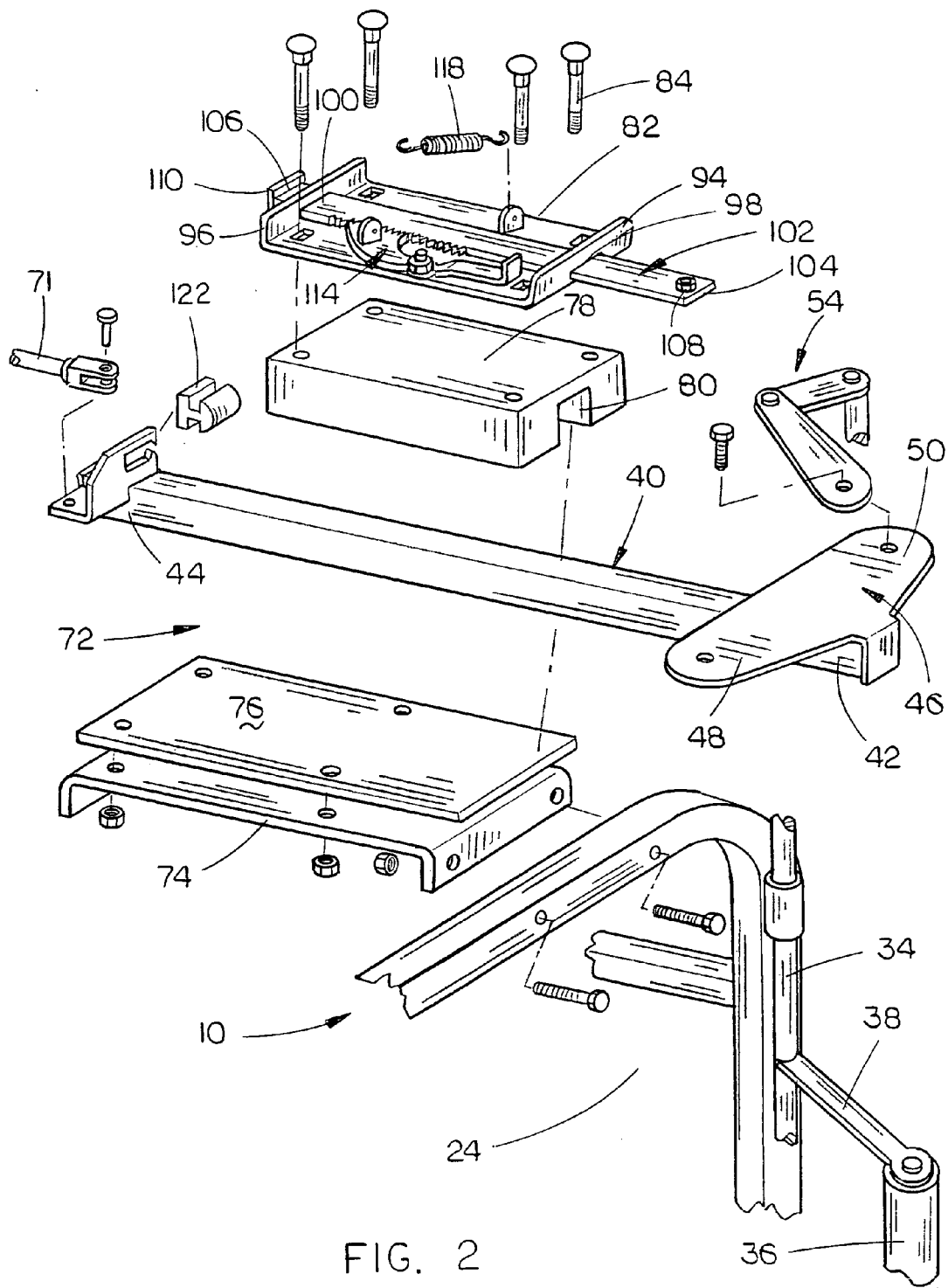
FIG. 2 is a partial exploded perspective view of the entrance gate of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to an animal or livestock sorter of generally conventional design sold by many companies including the assignee of this invention. Sorter 10 includes a confining cage 12 having an upper end 14, lower end 16, a first side 18, a second side 20 an exit end 22 and an entrance end 24. The exit end 22 includes an exit gate means 26. A conventional weighing scale is provided in the lower end of the cage 12 in conventional fashion.

A first vertically disposed shaft 28, having upper and lower ends, is rotatably mounted on the cage 12 at the entrance end 24 adjacent the first side 18 as seen in the drawings. The numeral 30 refers to a first vertically disposed gate member having upper and lower ends which is spaced from the first shaft 28 and which is operatively connected thereto by a first support means 32 extending therebetween. The numeral 34 refers to a second vertically disposed shaft having upper and lower ends which is rotatably mounted on the cage 12 at the entrance end 24 adjacent the second side 20 thereof. The numeral 36 refers to a second vertically disposed gate member having upper and lower ends which is spaced from the second shaft 34 and which is connected thereto by means of a second support means 38 which is secured thereto and extends therebetween.

The numeral 40 refers to an elongated actuator member having a first end 42 and a second end 44. Actuator member 40 is horizontally slidably movable on the upper end of the cage 12 as will be described in more detail hereinafter. As seen, the first end 42 of the actuator member is positioned at the entrance end of the cage 12. A horizontally disposed support plate 46 is secured to the end 42 of actuator member 40 and includes opposite side portions 48 and 50. A first linkage means 52 is secured to and extends between side portion 48 of support plate 46 and the upper end of shaft 28. A second linkage means 54 is secured to side portion 50 of support 46 and the upper end of shaft 34.

Linkage means 52 includes a link member 56, one end of which is pivotally secured to the support plate by pivot pin or bolt 58. The other end of link member 56 is pivotally connected to one end arm 60 by pivot pin or bolt 62 with the other end of arm 60 being welded or otherwise secured to the upper end of shaft 28.

The linkage means 54 is comprised of link member 64, one end of which is pivotally connected to side portion 50 of support plate 46 by pivot pin or bolt 66. The other end of link member 64 is pivotally connected to one end of arm 68 by pivot pin or bolt 70 with the other end of arm 68 being welded or otherwise secured to the upper end of shaft 34.

The inner or second end 44 of actuator member 40 is operatively connected to a pneumatic cylinder 71 or the like for moving the actuator member 40 between a retracted position to an extended position and vice versa. When the actuator member 40 is in its retracted position, the gate members 30 and 36 are in their fully closed position to prevent an animal from entering the cage 12 and to prevent an animal that is in the cage 12, from backing rearwardly out of the cage. When the actuator member 40 is in its fully extended position, the gate members 30 and 36 are in their fully open position so that the entrance end 24 is completely open. The fact that the entrance end 24 is completely open would permit more than one animal from entering the cage at the same time which would therefore interfere with the weighing of the animal. It is to this generally conventional structure described above that the instant invention is provided to adjustably limit the amount of opening movement of the gate members 30 and 36 so that only a single animal may enter the cage 12 at any time. Heretofore, the extended stroke of the actuator member 40 was limited by means of an adjustment bolt assembly which required the use of a wrench, pliers or other tool to make the adjustment. The instant invention eliminates the need of a wrench, pliers or other tool to perform the adjustment of the gate members in a quick and efficient manner.

The adjustment means for controlling the amount of opening movement of the gate members 30 and 36 is referred to generally by the reference numeral 72 and includes a mounting plate 74 which is bolted or otherwise secured to the upper end of cage 12 at the entrance end thereof. A plastic or Nylon sheet member 76 is positioned on the upper end of plate 74 and slidably supports the lower surface of actuator member 40. The numeral 78 refers to a plastic or Nylon block which is positioned on sheet member 76 and which has an elongated channel 80 formed in the underside thereof which slidably receives actuator member 40 therein. Base plate 82 is positioned on block 76 as illustrated in the drawings. Bolts 84 extend downwardly through base plate 82, block 76, sheet member 76, mounting plate 74 and have nuts at the lower ends thereof to secure the same to mounting plate 74.

Base plate 82 includes a first end 86, second end 88, first side 90 and second side 92. Upstanding flanges or lips 94 and 96 are provided at ends 86 and 88 of base plate 82 respectively and have openings or slots 98 and 100 formed therein respectively. Bar 102, having ends 104 and 106, is selectively slidably mounted on base plate 82 and slidably extends through the slots 98 and 100 so that its end 104 is positioned outwardly of flange 94 and so that its end 106 is positioned outwardly of flange 96. A retaining bolt 108 is provided on the end 104 of bar 102 to prevent the inadvertent separation of bar 102 from base plate 82. A bumper 110 is provided on the end 106 of bar 102 as illustrated in the drawings. One side of bar 102 is provided with angularly disposed teeth 112 formed therein.

Figure 3:
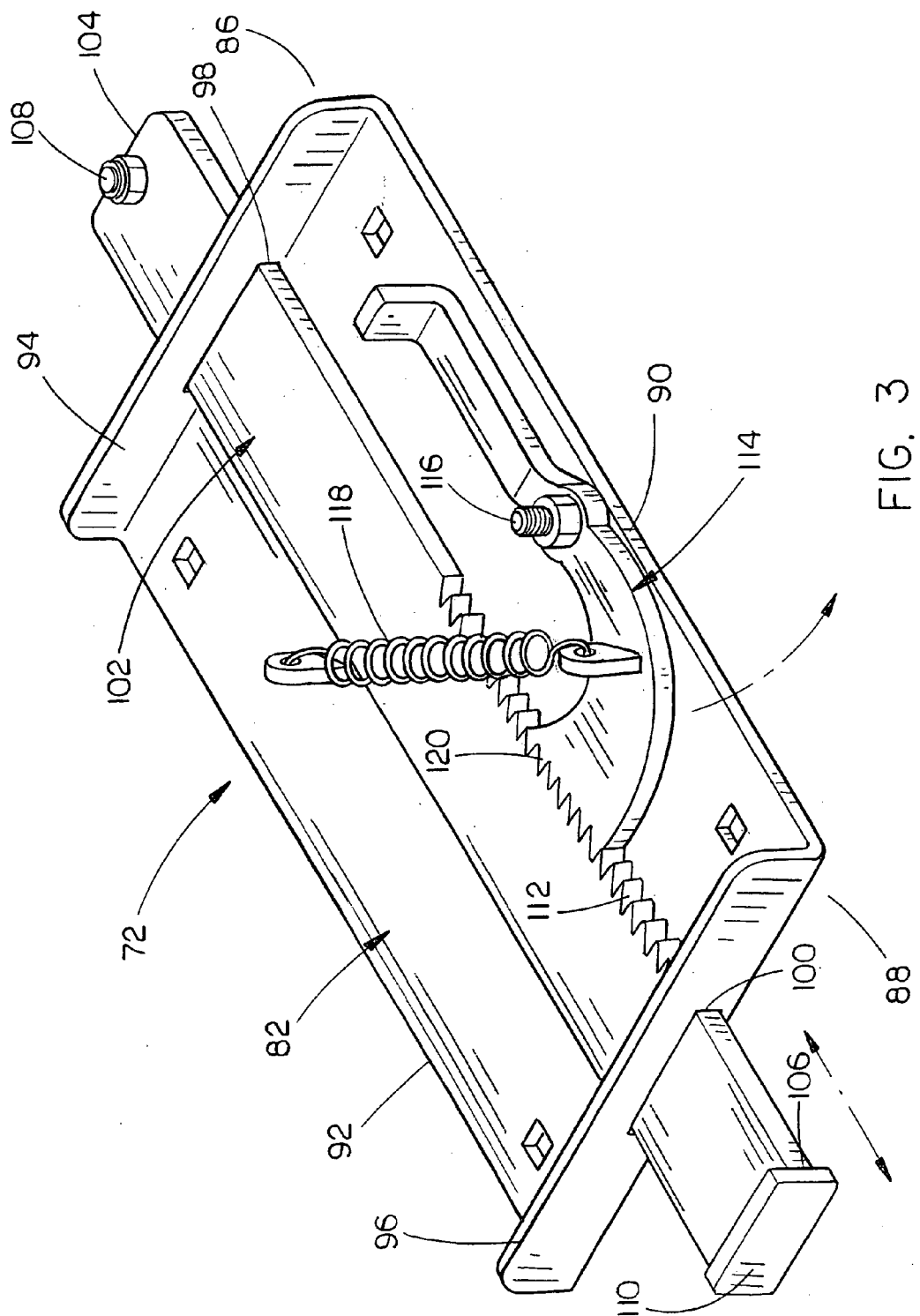
FIG. 3 is a perspective view of the means for adjusting the amount of entrance gate opening.
Figure 4:
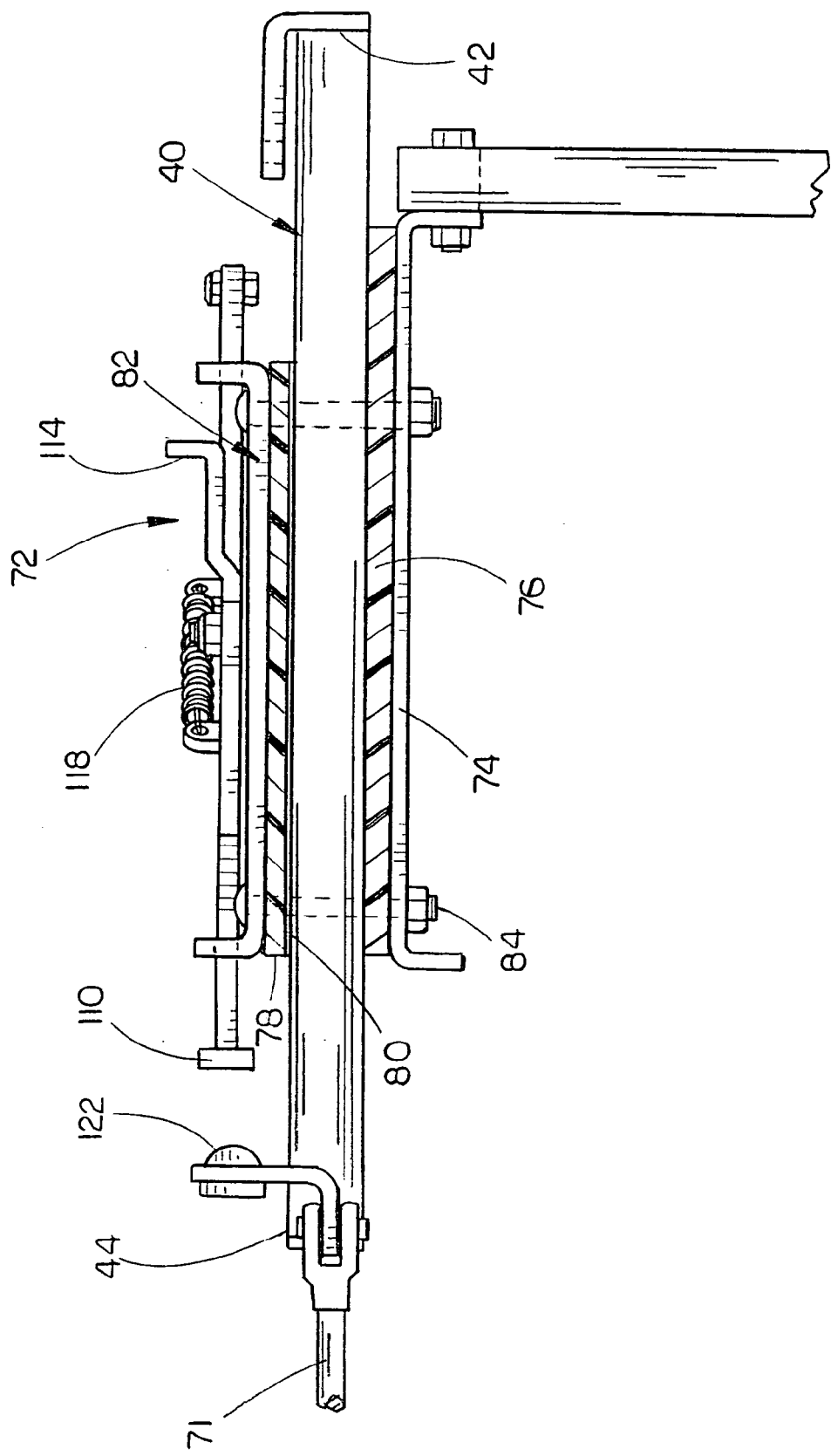
FIG. 4 is a sectional view of the means for adjusting the amount of entrance gate opening.
Figure 5:
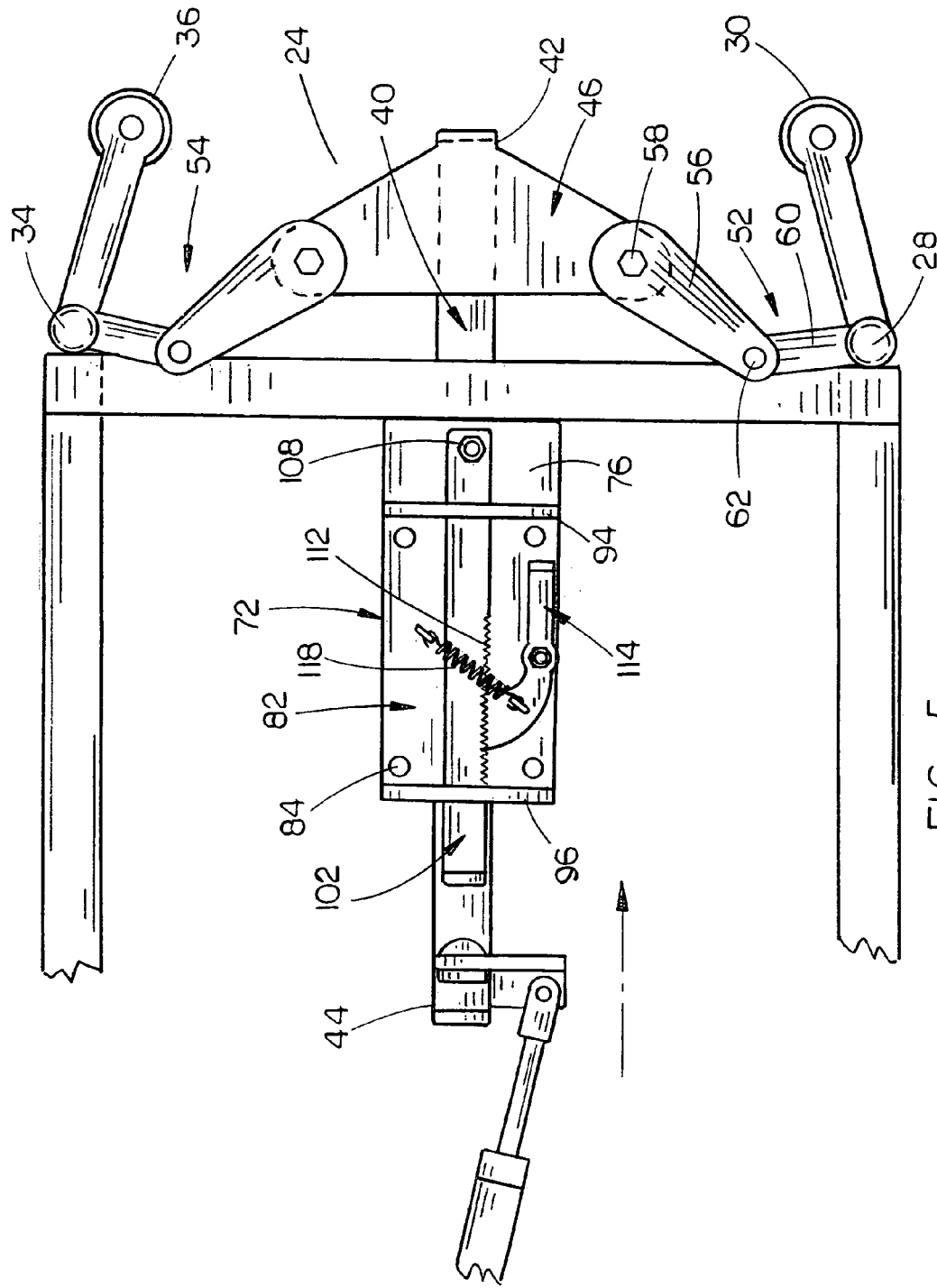
FIG. 5 is a top view of the entrance gate of this invention.

Locking lever 114 is pivotally secured to base plate 82 by pivot pin 116 and is selectively movable between locked and unlocked positions. Spring 118 yieldably maintains lever 114 in its locked position. One side of lever 114 has a plurality of angularly disposed teeth 120 formed therein which are adapted to mesh with teeth 112 when lever 114 is in its locked position to prevent the movement of bar 102 to the right as viewed in FIG. 3. The angular relationship of the teeth 112 and 120 permits the bar 102 to be manually adjustably pushed or moved to the left as viewed in FIG. 3 without moving locking lever 114 to its unlocked position. A stop or bumper 122 is secured to the actuator member 40 adjacent end 44 thereof and is adapted to engage the bumper 110 when the actuator member 40 is moved to its extended position with the engagement of the stop 122 with the bumper 110 limiting the amount of opening movement of the gate members 30 and 36 thereby limiting the horizontal width of the entrance opening so that only a single animal may enter the cage at one time.

When it is desired to increase the width of the opening or space between the gate members 30 and 36, when in their open position, locking lever 114 is moved to its unlocked position and the bar 102 is slidably moved towards end 86 of base plate 82 thereby permitting an additional amount of stroke of the actuator member 40. If it is desired to decrease the width of the opening between the gate members 30 and 36, bar 102 may be manually moved to the left which will cause the teeth 112 to ratchet over the teeth 120. Alternatively, the locking member 114 may be moved to its unlocked position to move the bar 102 to the left if so desired.

Thus it can be seen that a novel adjustment means has been provided to vary the distance between the gate members 30 and 36 without the need of utilizing the need of a wrench, pliers, or other tool. The adjustment is easily and quickly performed.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An entrance gate for a livestock sorter including a weighing scale within a cage having an upper end, a lower end, a first side, a second side, an exit end which is selectively closeable by an exit gate and an entrance end; comprising:
    an elongated, horizontally disposed actuator member, having first and second ends, slidably mounted on the cage at the upper end thereof which is selectively movable between a retracted position to an extended position;
    said first end of said actuator member being positioned at the entrance end of the cage;
    a horizontally disposed support plate fixed to said first end of said actuator member for movement therewith and having first and second ends disposed at opposite sides of said actuator member;
    a first vertically disposed shaft, having upper and lower ends, rotatably mounted on the cage at the entrance end thereof at the first side thereof;
    a second vertically disposed shaft, having upper and lower ends, rotatably mounted on the cage at the entrance end thereof at the second side thereof;
    a first vertically disposed gate member having upper and lower ends which is spaced from said first shaft;
    a first support means secured to and extending between said first shaft and said first gate member;
    a second vertically disposed gate member having upper and lower ends which is spaced from said second shaft;
    a second support means secured to and extending between said second shaft and said gate member;
    a first linkage means secured to and extending between said first shaft and said first end of said support plate;
    a second linkage means secured to and extending between said second shaft and said second end of support plate;
    the movement of said first actuator member from its extended position to its retracted position causing said first and second gate members to move to a closed position wherein they prevent an animal from entering the cage through the entrance end thereof and prevent an animal within the cage from moving rearwardly from the cage through the entrance end thereof;
    the movement of said actuator member from its retracted position to its extended position causing said first and second gate members to move from their closed position towards an open position wherein they permit an animal to enter the cage through the entrance end;
    a first stop secured to said actuator member adjacent the second end thereof;
    an adjustable second stop means mounted on the cage which is adapted to be engaged by said first stop as said actuator member is moving between its retracted position to its extended position to limit the amount of opening movement of said first and second gate members as they move from their closed positions to their open positions to adjustably vary the horizontal distance between said first and second gate members when they are in their open positions;
    said second stop means being adjustable without the need of a wrench or the like.

2. The entrance gate of claim 1 wherein each of said first and second gate members are rotatable about a vertical axis.

3. The entrance gate of claim 1 wherein said first stop comprises a resilient bumper.

4. The entrance gate of claim 1 wherein said second stop means comprises:
    a horizontally disposed base plate secured to the cage and having a first end, a second end, a first side and a second side; an elongated bar selectively slidably mounted on said base plate and having a first end, a second end which protrudes from said second end of said base plate, a first side and a second side;
    said first side of said bar having a plurality of teeth formed therein;
    a locking lever selectively pivotally mounted on said base plate about a vertical axis and being movable between a locked position and an unlocked position; a spring connected to said locking lever which yieldably maintains said locking lever in its locked position; said locking lever having a side portion positioned adjacent said first side of said bar; said side portion of said locking lever having a plurality of teeth formed therein which are adapted to mesh with said teeth on said bar when said locking lever is in its said locked position to maintain said bar in a selected position with respect to said base plate; said second end of said bar adapted to be engaged by said first stop on said actuator member to limit the amount of opening movement of said gate members as said actuator moves from its retracted position to its extended position.

5. The entrance gate of claim 4 wherein said teeth on said bar and locking lever are angularly disposed so that when they are in mesh with one another they prevent the slidable movement of said bar towards said first end of said base plate.

6. The entrance gate of claim 5 wherein the angular arrangement of said teeth permit said bar to be manually moved towards said second end of said base plate without moving said locking lever to its unlocked position.

7. The entrance gate of claim 4 wherein said first end of said base plate has an upstanding first flange provided thereon and wherein said second end of said base plate has an upstanding second flange provided thereon, each of said flanges having an opening formed therein which slidably receive the ends of said bar.

8. The entrance gate of claim 7 wherein said first end of said bar has a retainer bolt secured thereto.

9. The entrance gate of claim 7 wherein said second end of said bar has a bumper provided thereon.

* * * * *